T. P. BEADLE.
NUT AND BOLT LOCK.
APPLICATION FILED SEPT. 29, 1910.
1,011,309.
Patented Dec. 12, 1911.
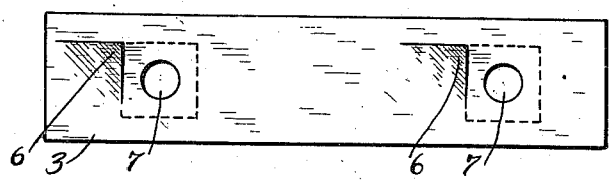
Fig. V.
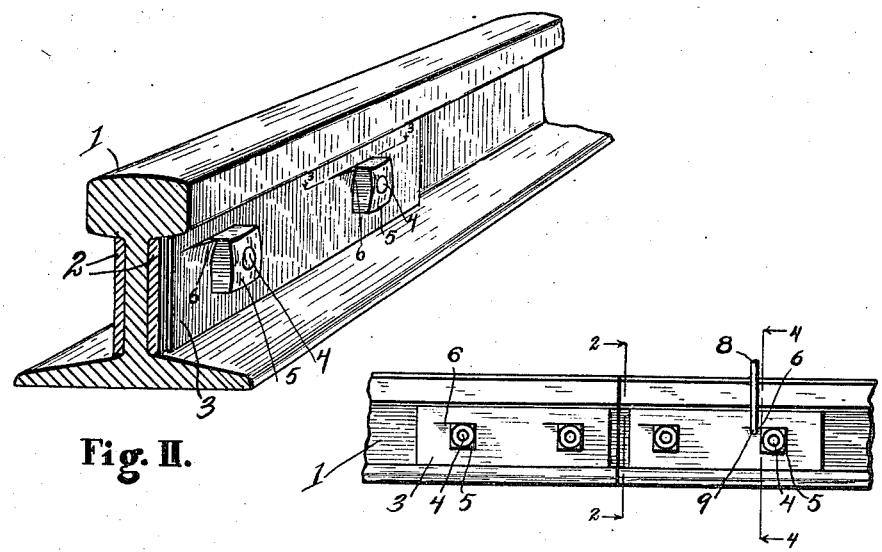
Fig. II.
Fig. I.
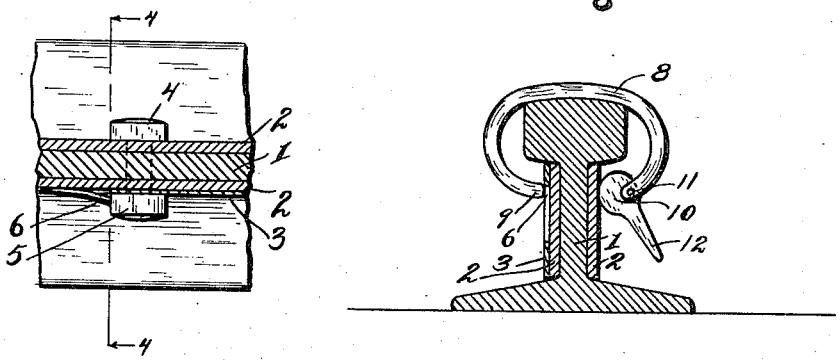
Fig. III
Fig. IV.
Inventor
Thomas P. Beadle
Witnesses
By
Attorney

UNITED STATES PATENT OFFICE.

THOMAS P. BEADLE, OF CLIMAX, MICHIGAN, ASSIGNOR OF ONE-HALF TO HORACE D. BEADLE, OF KALAMAZOO, MICHIGAN.

NUT AND BOLT LOCK.

1,011,309. Specification of Letters Patent. Patented Dec. 12, 1911.

Application filed September 29, 1910. Serial No. 584,535.

*To all whom it may concern:*

Be it known that I, THOMAS P. BEADLE, a citizen of the United States, residing at Climax, county of Kalamazoo, State of Michigan, have invented certain new and useful Improvements in Nut and Bolt Locks, of which the following is a specification.

This invention relates to improvements in nut locks.

It relates particularly to improvements in nut locks for fish joints, although the nut lock is adapted for use generally.

The objects of the invention are: to provide an efficient and cheap nut lock which can be readily applied and which can be readily depressed so that nuts can be removed.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a side elevation view of a rail joint with my improved nut locks in place on the fish joint. Fig. 2 is a detail transverse sectional perspective view, taken on a line corresponding to line 2—2 of Fig. 1. Fig. 3 is a detail sectional view, taken on a line corresponding to line 3—3 of Fig. 2. Fig. 4 is a detail transverse sectional view, showing the method of depressing the nut lock when it is desired to remove the nut. Fig. 5 is a detail view of the nut lock plate removed.

In the drawing, all of the sectional views are taken looking in the direction of the little arrows at the ends of the section lines, and similar numerals of reference refer to similar parts throughout the several views.

Referring to the numerals of reference, railroad rails 1 are united by the usual fish plates 2, on which is arranged my improved nut lock plate 3, the bolts 4 extending entirely through the same and the nuts 5 turning onto the bolts in the usual way. A triangular locking lip 6 is struck up from within the borders of the plate 3 at the side of the nut for engaging the same. This is curved out at the point in a slight curve, so that the nut, in passing over the same, is engaged as though by a ratchet. The lip is struck up by suitable slits, one of which is parallel with one side of the nut when it is in the locked position. The slit at the side of the locked nut is not so long as the side of the nut and the corner of the nut in swinging projects over the end thereof so that it moves readily up the inclined surface without obstruction and to the locking position, the lip acting as a ratchet. The point projects on a lock for an inch square nut about one-fourth of an inch from the face of the plate. By this means, it is made impossible to turn the nut back. The plate 3 should be of saw-plate or mild steel so that the locking lip 6 will be elastic and can be depressed and will spring out readily when the nut is turned up. A round perforation 7 is through the plate for the passage of the bolt 4. The plate 3 extends over a pair of bolts at each end of the fish joint. Separate plates may be provided for each nut, the same being retained from rotation by engaging between the head and base of the rail, as will be clearly seen from an inspection of Figs. 1 and 2, or by any other means. By embracing an adjacent bolt the plate may be made very thin and yet do its work effectively. Such thin plate can only be effectively retained by this means in practical service on rail joints where the action of a passing train is very like a succession of sledge-hammer blows and sufficient to work a thin plate out of engagement with anything less secure.

To depress the nut lock and remove the nut, I may provide a special tool, consisting of a looped bar 8, having its end 9 conformed to press against the locking lip 6. A cam 10 is pivoted at 11 preferably on the opposite side, and is controlled by a little finger lever 12, so that this tool can be hooked over the rail and the cam turned and the locking lip depressed. This cam tool may be constructed to engage the device and depress the locking lip 6 in any desired manner.

An inspection of my improved nut lock will show that it is very simple to construct and adds substantially nothing to the expense, and that it will positively retain the bolt in position without undue stress upon the same. I desire to say also that when the same has been in position a long time and has become corroded, it is easily possible to apply a heavy wrench and tear off the locking lip 6, it being necessary, of course, to replace this lock with a new plate under such circumstances. It will thus be seen that my improved nut lock is adapted to be depressed and the nut removed so long as the same is in good condition. When, however, the parts become corroded, the nut lock will be very readily broken away by the application of a wrench. This is of advantage because, under such circumstances, it would be highly desirable to supply the nut with a new lock.

The nut lock can be depressed by various means. The tool which I have provided, however, is exceedingly effective for the purpose, and as it is very inexpensive can be very readily made a part of the track man's kit.

Having thus described my invention, what I claim as new and desire to secure by Letters Patent is:

1. In a nut lock, the combination of a spring plate perforated to receive the bolt, means to prevent the rotation of the plate, a right-angled locking lip struck up from the plate by suitable slits in proximity to the nut of the bolt and with one edge of less length than the side of the nut and in line with the side of said nut when said nut is locked, disposed to engage one side of the nut and curved out at the point whereby the sides and point of the lip are protected by the nut, and the corner of the nut will project beyond the end of said slit to readily turn over the inclined surface of said lip and depress the same, and the side of the nut be engaged by said lip the full width thereof, as by a ratchet, as described.

2. In a nut lock, the combination of a spring plate perforated to receive the bolt, means to prevent the rotation of the plate, consisting of a perforation engaging an adjacent bolt, a right-angled locking lip struck up from the plate by suitable slits in proximity to the nut of the bolt and with one edge of less length than the side of the nut and in line with the side of said nut when said nut is locked, disposed to engage one side of the nut and curved out at the point whereby the sides and point of the lip are protected by the nut, and the corner of the nut will project beyond the end of said slit to readily turn over the inclined surface of said lip and depress the same, and the side of the nut be engaged by said lip the full width thereof, as by a ratchet, as described.

In witness whereof, I have hereunto set my hand and seal in the presence of two witnesses.

THOMAS P. BEADLE. [L. S.]

Witnesses:
CLORA ELLYN BRADEN,
M. PHINA WOODRUFF.

---

Copies of this patent may be obtained for five cents each, by addressing the "Commissioner of Patents, Washington, D. C."